(12) United States Patent
Gunness

(10) Patent No.: US 8,566,051 B2
(45) Date of Patent: *Oct. 22, 2013

(54) LEAK DETECTION AND LOCATION SYSTEM, METHOD, AND SOFTWARE PRODUCT

(76) Inventor: Clark Robert Gunness, Nashville, TN (US)

( * ) Notice: Subject to any disclaimer, the term of this patent is extended or adjusted under 35 U.S.C. 154(b) by 354 days.

This patent is subject to a terminal disclaimer.

(21) Appl. No.: 13/009,356

(22) Filed: Jan. 19, 2011

(65) Prior Publication Data

US 2011/0178747 A1 Jul. 21, 2011

Related U.S. Application Data

(60) Provisional application No. 61/336,244, filed on Jan. 19, 2010.

(51) Int. Cl.
*G01R 19/00* (2006.01)
*G06F 19/00* (2011.01)

(52) U.S. Cl.
USPC ............... 702/65; 324/444; 324/559; 702/51

(58) Field of Classification Search
USPC .................... 702/51, 55, 64, 65, 188; 73/584; 324/444, 557, 559
See application file for complete search history.

(56) References Cited

U.S. PATENT DOCUMENTS

| | | | | |
|---|---|---|---|---|
| 4,947,470 A | * | 8/1990 | Darilek | 324/557 |
| 5,184,083 A | * | 2/1993 | Groover | 324/559 |
| 7,141,982 B2 | * | 11/2006 | Fink | 324/444 |
| 2012/0197565 A1 | * | 8/2012 | Gunness | 702/64 |

* cited by examiner

*Primary Examiner* — John H Le
(74) *Attorney, Agent, or Firm* — Michael J. Persson; Catherine E. Napjus; Lawson Persson & Weldon-Francke, PC

(57) ABSTRACT

A system for detecting and locating a leak through a membrane that includes a detector array and computer. The detector array includes a boundary wire loop, sensors, and leads. The boundary wire loop surrounds the area to be tested and generates electrical tension on the surface of the membrane. The sensors are laid out in a sensor array and are placed on top of a membrane and within the boundary wire loop. The sensors are encased in a plastic covered cable or individual wires which have open ends for their terminations forming a cable so that the sensors made by the open terminations form a chain. Each sensor communicates individually with the computer and the signals from the sensors are used by the computer to perform vector mapping that detects and locates leaks through the membrane.

18 Claims, 7 Drawing Sheets

LEAK DETECTION AND LOCATION SYSTEM, METHOD, AND SOFTWARE PRODUCT

CLAIM OF PRIORITY

This application claims the benefit of priority of U.S. Provisional Patent Application Ser. No. 61/336,244, filed on Jan. 19, 2010.

FIELD OF THE INVENTION

The present invention relates to the detection and location of water leakage in structures, and in particular to computer controlled leakage detection and location systems.

BACKGROUND

Roof and waterproofing membranes and linings have long been used to protect buildings, to contain water in ponds and decorative water features, to prevent leaching of contaminants from landfills, and for other purposes. While these membranes have utility, leakage through the membranes is an ongoing problem. The efforts to contain and locate leakage have resulted in the rise of specialized consultants, air and vacuum testable membranes, and, in recent history, electrical testing methods that not only determine if a leak is present in a membrane system, but where the leak is located.

Some systems, such as that sold under the trademark SMARTEX, owned by Progeo Monitoring Corporation of the Federal Republic of Germany, detect leaks by detecting moisture in the roofing envelope. Sensors measure the combination of water vapor and temperature inside and outside of the roofing envelope and automatically transmit these data to the system computer for analysis. If the roofing envelope experiences any water intrusion, the system detects the increase in relative vapor pressure and will immediately trigger an alarm when unacceptable levels of water vapor are reached. This system has the advantage that is it able to be retrofitted to almost any existing roofing, and can also be placed in new and reroofing work.

Several other testing methods currently used in the industry test by means of electricity. One such system for leak detection is described in U.S. Pat. No. 6,225,909 to Nill. This system discloses roof vents including at least one moisture sensing element which is electrically coupled to an electrical connector in the roof vent. A portable moisture sensing circuit or device with a moisture display for indicating a degree of moisture is provided with an electrical connector which mate with the electrical connector in the roof vent. When it is time to inspect the roof, a worker carries the portable device from one roof vent to another and plugs the device connector into the vent connector to take a moisture reading from the sensing element(s) associated with each vent. Although functional, this system is disadvantaged in that it is not automated and thus depends on the skill and accuracy of a human. Moreover, with the repeated plugging and unplugging of the device connector, the elements of the system are more susceptible to wear and tear than a system that is fully automated and whose components are not regularly handled.

Many other systems and methods using electrical leak detection include an array of sensors and use telemetry, triangulation, or tomography to determine the location of the leakage. The data generation for these methods of leak location is achieved by attenuation of voltage as it travels from a hole in the membrane, which is the entry point of the current or signal, to individual sensors in the sensor array. Sensors that are further removed from the leakage point will sense less current or signal amplitude than those nearer the leakage point, which permits a triangulation to and, thus, location of the leak.

Electrically testable systems require one surface of the membrane to be charged with an electrical current or signal while the other side of the membrane is in contact with an electrical ground. The membrane itself must be electrically insulating, i.e. non-conductive. Then, if there is a breach in the membrane, the electricity flows through the breach to the other, grounded, side of the membrane. The electrical tension, i.e. the amount of current present, is measured either from the top side or bottom side of the membrane, depending upon which system is utilized, to determine where the breach in the membrane is located.

In one example of electrically testable systems, permanent sensors which measure the current are installed on the grounded side of the membrane, which is the dry underside, or bottom of the membrane. The top, or ungrounded side, is wet and subject to weather. In this embodiment, the top of the membrane is generally charged and any leakage is detected by the current flowing through the breach and being detected by the sensors underneath. This system works with any type or configuration of overburden, and at any depth of overburden. This system is limited to certain membrane systems which do not require absolute adhesion to the roof deck or substrate to be effective waterproofing elements. The types of roofing or waterproofing systems compatible with this embodiment can be either loose-laid over the deck, or applied like a built-up roof, in plies. These can also be applied directly over insulation or substrate board. In these systems, it does not matter that the sensor grid assembly interferes with the adhesion of the roofing or waterproofing. Although effective in certain circumstances, this system is disadvantaged in that it must be installed when the roof is constructed and cannot be retrofitted into an existing roofing assembly.

Another example of electrically testable systems, known as vector mapping, presents a process by which the differences in electrical tension created by a negatively charged wire loop on the membrane are measured, and the decline in electrical tension is followed to a breach in the membrane. This requires two poles, one held in each hand, and the distance between the poles allows the difference in electrical tension to be measured. This embodiment is a standard procedure for detecting leaks in roofing and waterproofing membranes. FIG. 1 schematically demonstrates how electrical tension on a membrane 11 is created. The negatively charged boundary wire 4 is activated by a computer 10, which pulses a current, which is usually at approximately thirty eight volts. The tension is indicated by the arrows, with the current field filling the wet surface of the membrane 11. Because there is no way to ground, the tension resembles the water in a bathtub, remaining relative calm and level.

FIG. 2 demonstrates what happens when a breach occurs in a membrane 11, which allows the electrical field to flow to ground. The same tension is created by the computer 22, but the flow of the current is directed to the grounding point, or hole 1, in the membrane 11. The voltage drops exponentially nearer to the hole 1 and this voltage difference is measured by the hand-held poles mentioned above. In practice, the tester will traverse the membrane 11 taking measurements until the voltage drop is found.

This system is useful with most types of bare or exposed membranes which are in contact with a grounded substrate, and can be used to detect and locate leakage under certain types of clean, conductive overburden, such as soil, ballasted inverted roofs, and certain planted green roofs. This method is particularly useful when the roofing or waterproofing system depends upon an intimate bond with the substrate—usually concrete—to provide reinforcement for its proper functioning. Unlike the first example, discussed above, which would interfere with this bond, this embodiment is done entirely from the upper surface of the roof membrane and is very effective in locating leakage. Finally, this system has, heretofore, been the only type of system that does not need to be installed at the same time that the roofing membranes are installed.

Unfortunately, the system described in FIGS. 1 and 2 has its disadvantages. Specifically, if there is anything overlaying the roofing membrane that is inherently non-conductive, such as a plastic root barrier for green roofs, or wide plastic drainage mats applied to the roof surface prior to the application of ballast, the current can no longer flow directly to the breach in the membrane and, instead, must flow along the surface and edges of the non-conductive overlayment.

FIG. 3 shows the condition in which a non-conductive sheet 13 of plastic is placed on the roofing membrane 11. The vector is now only detectable at the edges of the sheet 13, and the location of the hole 1, still in the same spot as before, is hidden by the sheet 13.

FIG. 4 shows what happens when multiple sheets 13 of non-conductive material are placed on a membrane with a leak. The current can only flow between the sheets 13, so one might know that a leak is present, but the rough location of the leak would be "somewhere under the non-conductive sheet". This seriously impedes or negates the ability of the manual mapping procedure to accurately locate leakage. Also, the deeper and more complicated the overburden is in terms of number of overlayments, depth of soils, types of plantings, electrical conduits and other grounded elements, and topside finishes, such as walkways, fountains, and planters, the less effective the manual mapping procedure becomes. In many of these situations, manual mapping cannot be utilized at all. Moreover, this system is a manual process, thus requiring skilled manpower. Consequently, and moreover, leaks may only be detected and located when a skilled technician is present and testing.

Other similar methods include those taught in U.S. Pat. No. 7,652,481 to Vokey. In these methods, a leak in a membrane on top of a horizontal roof deck is located by applying conductive wires on the membrane underneath the aggregate in a grid pattern. A measuring and switching circuit generates voltage having a positive attached to the roof deck and a negative attached to the wires. The circuit has a relay for each wire which can be switched between a current sensor system and the negative potential. The sensor system is arranged to sense at each of the wires in turn the current flowing from the roof deck through any leak in the membrane to the wire. A microprocessor operates the relays in turn to connect all the other wires to the negative as a shield while each wire is sensed. From the output of the grid, the changes in current in the x and y directions are analyzed to locate the leak in the membrane.

Although capable of detecting leaks, these methods also have their disadvantages. Specifically, they must be implemented during construction as the positive component is attached to the roof deck beneath the membrane. Moreover, the measuring and switching circuit is complicated, and only measures the current at one wire at a time, rather than sensing the current over the entire area being tested at all times.

Therefore there is a need for a system for detecting and locating leakage in roofing and waterproofing membranes that may be installed over existing waterproofing membranes, that utilizes the principles of electrical field vector mapping but applies the principle to a permanently installed, computer controlled, always-on system, that provides a system wherein the sensor array is placed directly on top of the roofing membrane and within the electrical field created by the negatively charged boundary wire loop, that allows the sensor array to be wet and withstand environmental stress, that allows the sensor array to be located directly under conductive and non-conductive elements which would impede or negate other types of manual vector mapping, and that allows the sensor array to be positioned below any grounded or non-conductive elements.

SUMMARY OF THE INVENTION

The present invention is a system, software product, and method for leak detection and location.

In its most basic form, the system of the present invention includes a detector array and computer. The detector array includes a boundary wire loop, sensors, and leads. The boundary wire loop surrounds the area to be tested, generates electrical tension on the surface of the membrane, and is connected to the computer by a lead. The sensors are laid out in a grid, or sensor array, and are placed on top of an impermeable roofing or waterproofing membrane, and within the boundary wire loop. The sensors, or open cable ends, form a chain and are either encased in a protective conductive plastic coating or are run as individual wires that have open ends for their terminations forming a cable so that the open terminations, in a string, form a sensor strip. Each sensor in a sensor strip has its own dedicated wire so that it, and only it, may communicate with the computer. The sensor strips may be connected to the computer by leads.

The computer preferably includes a processor, memory, and a software product stored in the memory and executable by the processor. The computer may be a computer located on the same premises as the detector array, or it may be a handheld portable computer or a remote computer. The computer may relay information to a central processing computer for mapping and evaluation of the data collected from the sensors. This relaying is preferably performed via the Internet. The software product is the software product of the present invention, as described below.

In a preferred embodiment, the computer also includes a signal device. The signal device may be in electrical communication with the boundary wire loop and controlled by the computer. When the system of the present invention is activated, the signal device may provide voltage to the boundary wire loop, thus creating an electrical field. The sensor array may be within this field. In a preferred embodiment, the voltage may be varied by the computer to provide maximum definition of leak detection and location. In some embodiments, the signal device is separate from the computer, but is still controlled by the computer.

In its most basic form, the software product comprises software code for activating the signal device, for monitoring the electrical field of the roofing or waterproofing being tested, and for sending an alert when necessary.

Monitoring the electrical field involves polling the sensors for voltage and detecting changes in the voltage from one sensor to another. If the field has no access to ground, the sensors will maintain a relatively constant voltage. If there is access to ground, especially if this access is caused by a leak or breach in the membrane, then the current in the field will be drawn to this ground and the shape of the field will change. This field distortion may be measured by voltage changes detected by the sensors. As this system is preferably automated and controlled by a computer, monitoring may occur at all times, allowing leaks or breaches in membranes to be detected very quickly.

Sending an alert preferably involves notifying an appropriate party if and when leakage occurs and indicating where the leak is located. The notification may be by any means commonly used in the art, such as an email, text, instant message, or an alarm.

In some embodiments of the present invention, the software product also includes code for mapping the roofing or waterproofing membrane and evaluating the map. Mapping the membrane involves analyzing the changes in the electrical field based on the voltages detected by the sensors and overlaying a depiction of the electrical field onto a schematic of the physical membrane. Evaluating the map involves locating the field's access to ground on the schematic, which may be a leak or breach. In some embodiments, these steps are performed not by the computer of the system of the present invention, but by a central processing computer. In embodiments in which these steps are performed by a central processing computer, the software product of the present invention also includes software code for relaying data to the central processing computer. This relaying of data may be performed via the Internet or any other communication means commonly used in the art.

In a preferred embodiment of the present invention, the system may also include an exposed electrode, which may be placed anywhere on the area to be tested in order to simulate a leak or breach in the membrane. If activated by the computer, an electronic gate is opened allowing the electrode to be grounded, thus imitating a leak or breach. This process serves as a test of the system to ensure it is working properly. In this preferred embodiment, the software product may also include software code for testing the system by activating the electrode and opening the electronic gate.

In a preferred embodiment, the software product also includes software code for varying the voltage applied to the boundary cable loop and determining if any sensor has failed. Determining if any sensor in the sensor array has failed involves a system check in which each sensor is checked for proper functionality. Such checks may be performed on a set schedule, or whenever deemed necessary. The checks may be performed in conjunction with testing the system with an exposed electrode, as described above. With a known source of grounding, each sensor may be checked to ensure that it is detecting the grounding as it should.

In its most basic form, the method of the present invention includes the steps of installing a detector array on top of a roofing or waterproofing membrane, providing a charge to a boundary wire loop that is part of the detector array, monitoring the resultant electrical field, mapping the membrane, and alerting as to the presence of a leak or breach when necessary. In some embodiments, the method may also include the step of testing the system.

This system has several advantages over prior art systems. The sensors of the present invention are located in the same plane as the membrane being tested, which has several important consequences. First, unlike the situation depicted in FIGS. 3 and 4, the sensors are located below any non-conductive sheet that may be present. The current flowing under the non-conductive sheet has the same distribution and shape as if the non-conductive sheet were not present. Thus, the sensors may sense the change in voltage that is used to locate the hole or leak despite the presence of a non-conductive sheet. Second, this system may be installed on existing construction, as well as with new. In addition to the advantage of having the sensors in the same plane as the membrane, the system of the present invention is advantageous in that it may always be wet and withstand environmental stress. This is because the sensors are solid contact-only points and the cable coating is a conductive HDPE, which is very stable.

Therefore it is an aspect of the present invention to identify and locate leakage in roofing and waterproofing membranes utilizing the principles of electrical field vector mapping, but applying the principle to a permanently installed, computer controlled, always-on system.

It is a further aspect of the present invention to provide a system in which the sensor array is placed directly on top of the roofing membrane and within the electrical field created by the negatively charged boundary wire loop.

It is a further aspect of the present invention to provide a system in which the sensor array may be always wet and can withstand environmental stress.

It is a further aspect of the present invention to provide a system in which the sensor array may be located directly under conductive and non-conductive elements that would impede or negate other types of manual vector mapping.

It is a further aspect of the present invention to provide a system in which the sensor array, so positioned below any grounded or non-conductive elements, may identify the occurrence and location of leakage using the principles of vector mapping.

It is a further aspect of the present invention to provide a system in which the sensor array is polled by a computer located on the premises, by a hand-held portable computer, or by a remote computer.

It is a further aspect of the present invention to provide a system in which the computer may be connected to the Internet to relay data collected to a central processing computer for mapping and evaluation.

It is a further aspect of the present invention to provide a system that may generate electronic "test leaks" to determine if the system is working properly, i.e. identifying and locating grounded signals within the body of the electrical field.

It is a further aspect of the present invention to provide a system in which the voltage of the negatively charged boundary wire loop may be varied by the computer to provide maximum definition of leak detection and location.

It is a further aspect of the present invention to provide a system that may notify the building authorized person if and when leakage occurs and where the leak is located.

It is a further aspect of the present invention to determine if any sensor in the sensor array or grid has failed and can compensate for that failed sensor.

These aspects of the present invention are not meant to be exclusive and other features, aspects, and advantages of the present invention will be readily apparent to those of ordinary skill in the art when read in conjunction with the following description, claims, and accompanying drawings.

DETAILED DESCRIPTION OF THE INVENTION

Figure 1:
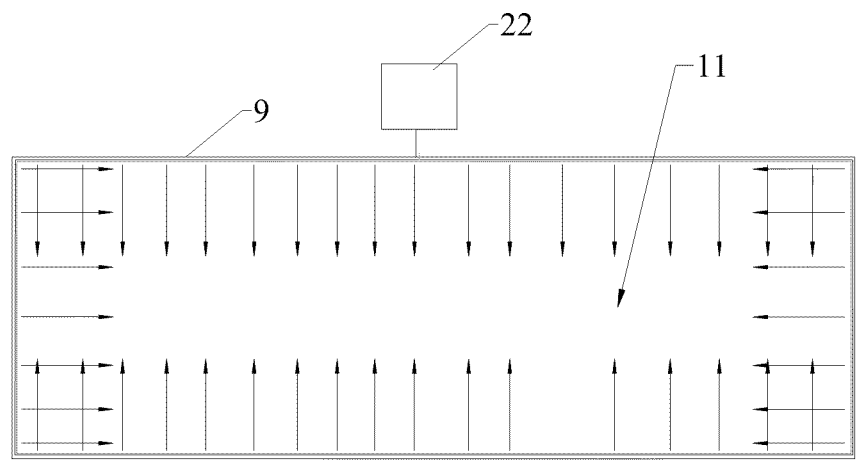
FIG. 1 is a schematic depiction of a prior art vector mapping electrical field when the field has no access to ground because the membrane to be tested has no leak or breach.
Figure 2:
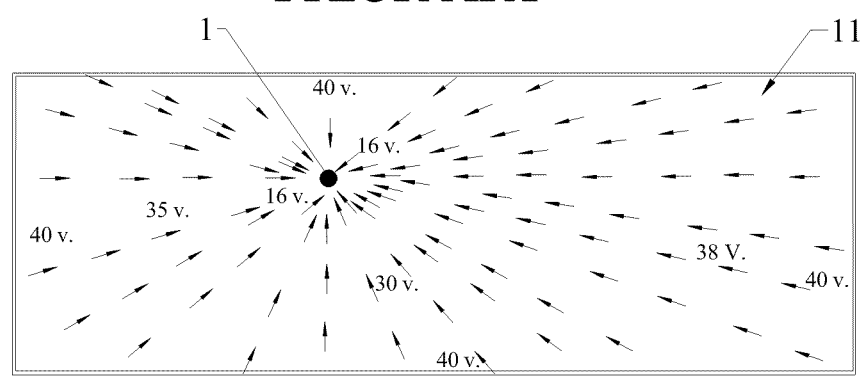
FIG. 2 is a schematic depiction of a prior art vector mapping electrical field when the field has access to ground because the membrane to be tested has a leak or breach.
Figure 3:
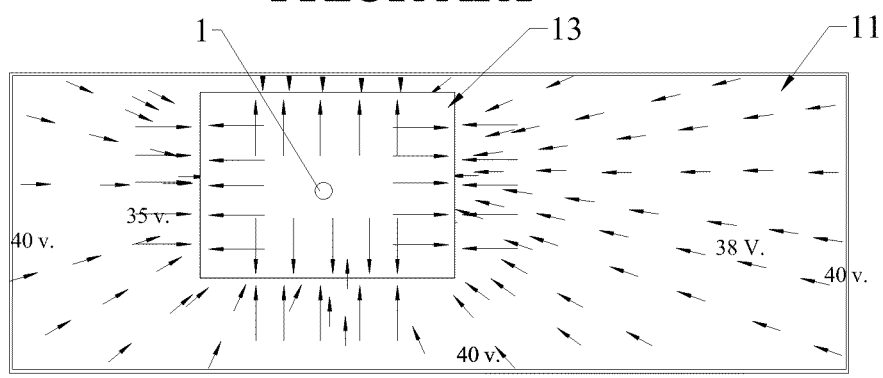
FIG. 3 is a schematic depiction of a prior art vector mapping electrical field with a single non-conductive overlay.
Figure 4:
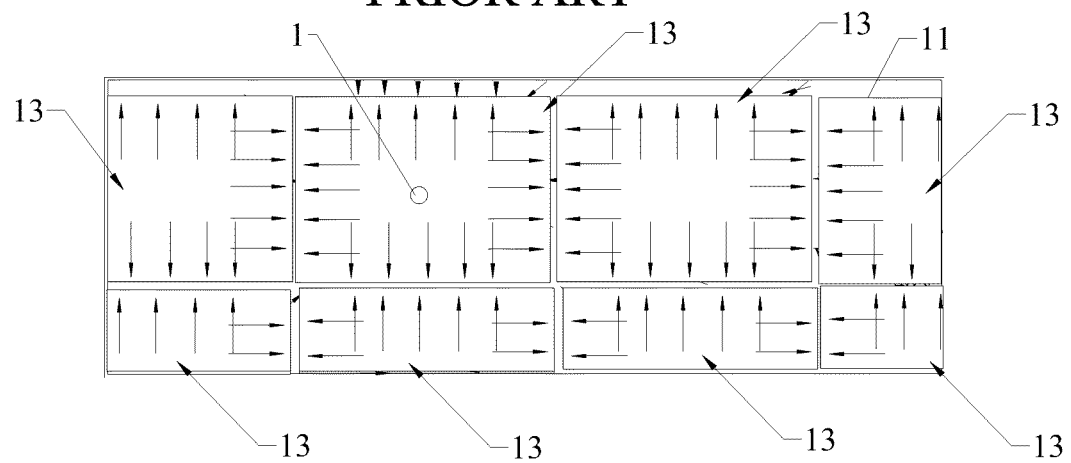
FIG. 4 is a schematic depiction of a prior art vector mapping electrical field with a series of non-conductive overlays.
Figure 5:
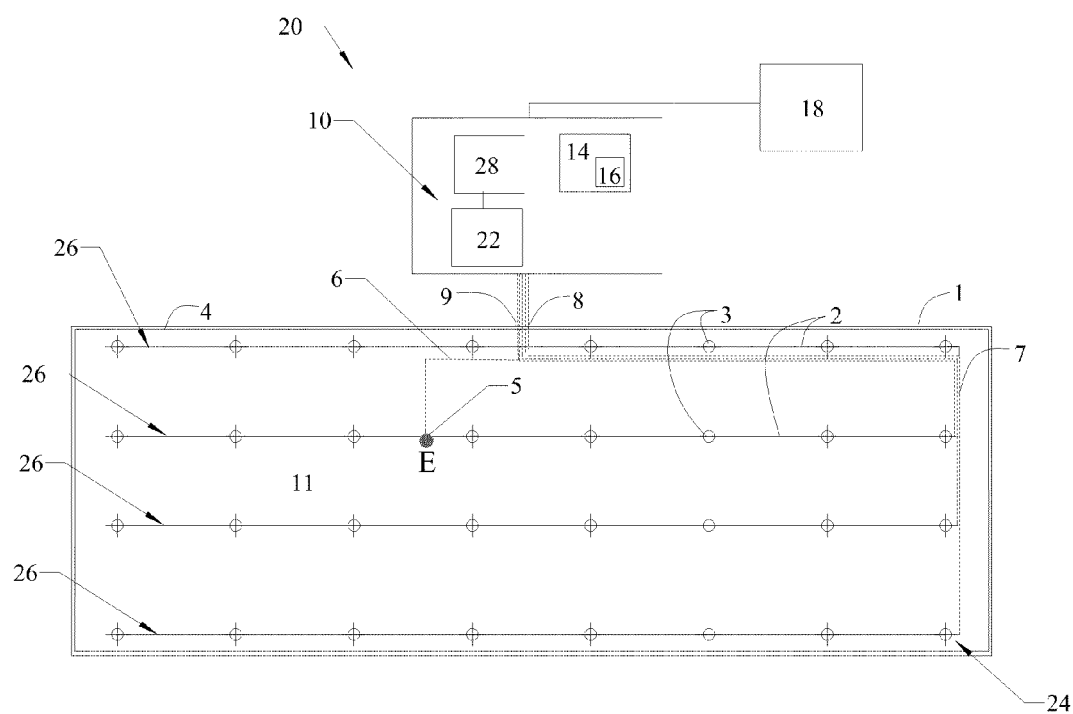
FIG. 5 is a schematic depiction of the system of the present invention.

FIG. 5 is a schematic depicting a preferred system 20 of the present invention. System 20 includes a boundary wire loop 4, sensor array 24, and electronic "test leak" 5 on top of an impermeable roofing or waterproofing membrane 11. The purpose of membrane 11 is to protect a building roof, foundation, plaza, deck, pond or reflecting pool, landfill or environmental lagoon, or anywhere that leakage of water or other contaminants through a protective or containment membrane is a concern.

Sensors 3 may detect the strength of an electrical current field applied to the top of membrane 11. This electrical current field is commonly known as an electrical tension field, and the shape of the field is determined by the placement of the negatively charged boundary wire loop 4. The amount of charge in the field is determined by how much energy is imparted to the negatively charged boundary wire loop 4. Membrane 11, itself, must be electrically and continuously non-conductive, meaning that the current cannot pass through the membrane and there cannot be holes or other breaches in membrane 11 that affect the stability of the electrical field. Membrane 11 must be installed on a conductive surface (not shown), such as a conductive screen, or on top of a conductive deck or other conductive building element that leads to ground.

If there is leakage in membrane 11 such that the electrical field is destabilized by contact with the underlying grounded structure or grounding mesh, the field "flows" in the direction of the hole or leakage. This flow is indicated by a change in the overall density of the electrical field, as indicated by the amount of voltage present at any one point, decreasing geometrically until, at the hole or leakage, the current measurement is substantially reduced.

Sensor array 24 preferably includes a plurality of sensors 3 disposed along a series of strips 26 that are preferably encased in flat conductive plastic covered cables or are individual cables which have open ends for their terminations to form sensors 2, and a plurality of leads 6-9 that extend from the sensors 3 and connect to computer 10. Sensors 3 are preferably spaced two to thirty feet apart in both directions and are deployed across the upper surface of membrane 11 in a grid fashion. Each sensor 3 has its own dedicated lead within the cable so that it, and only it, can communicate with computer 10. Sensor strips 26 are connected to the computer via leads 7, 8. In some embodiments, leads 7, 8 are replaced by wireless or electromagnetic means of connection with computer 10. Electronic "test leak" 5 may be installed anywhere on membrane 11 and may be activated to test system 20 to determine if it is working properly. In the embodiment shown in FIG. 5, electronic "test leak" 5 is connected to computer 10 via lead 6. Negatively charged boundary wire loop 4 surrounds the area to be tested and generates the electrical tension on the surface of membrane 11 and is connected to computer 10 via lead 9.

Computer 10 preferably includes a processor 28, memory 14, a software product 16 stored in memory 14, and a signal device 22. Computer 10 is preferably in communication with remote central processing computer 18, preferably via the Internet. In some embodiments, central processing computer 18 performs the functions of mapping of the electrical field with respect to the physical area to be tested and evaluating the produced map to identify leak or breach locations. Processor 28 is in electrical communication with memory 14 and signal device 22. Memory 14 stores software product 16, whose functionality is described with reference to FIG. 9 below, and which is executable by processor 28.

Figure 6:
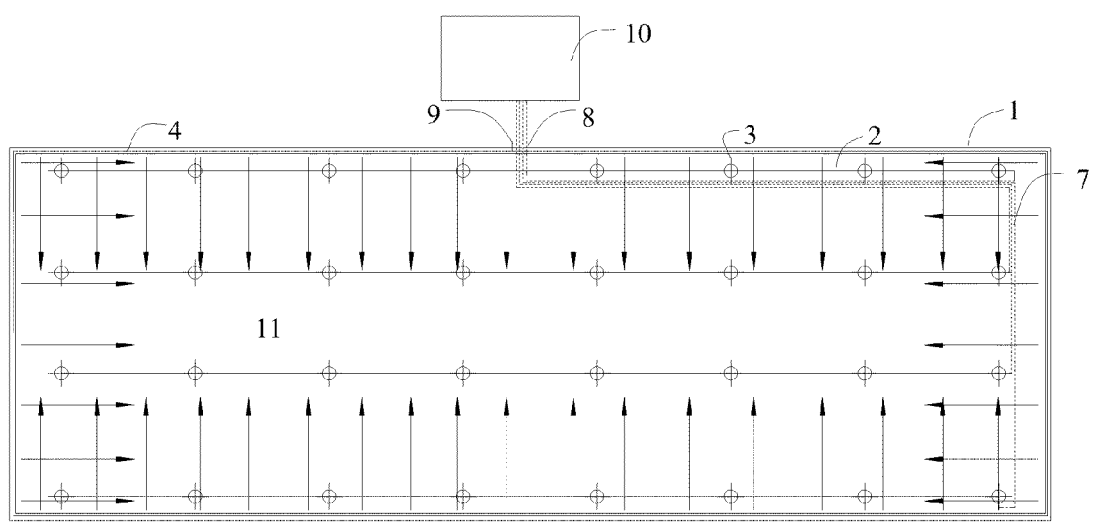
FIG. 6 is a schematic depiction of the system of the present invention with a vector mapping electrical field when the field has no access to ground because the membrane to be tested has no leak or breach.

As shown in FIG. 6, when the system is activated, signal device 22 within computer 10 provides a 12-50 volt charge to boundary wire loop 4, thus creating static electrical tension, otherwise known as a "field." As long as there is no access to ground within the body of the field, the field will look as shown in FIG. 6. When computer 10 polls sensors 3 during testing, the voltages reported by sensors 3 will be closely aligned and will indicate no leakage.

Figure 7:
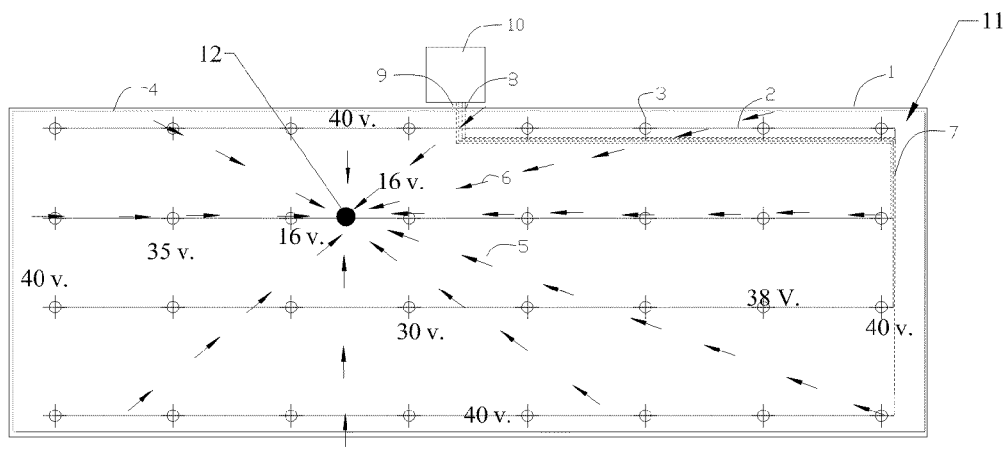
FIG. 7 is a schematic depiction of the system of the present invention with a vector mapping electrical field when the field has access to ground because the membrane to be tested has a leak or breach.

In FIG. 7, if there is access to ground within the field, especially if there is a leak or breach 12 in the roofing or waterproofing membrane 11, the current in the field will be drawn to this ground and the shape of the field will change to reflect this attraction. FIG. 7 shows a hypothetical shape of the field when this event occurs. Varying voltages within the field are indicated. At that time, the field distorts and the differences in voltage can be measured by the computer polling each individual sensor 3 and articulating the results as a map showing the location of leak or breach 12.

Figure 8:
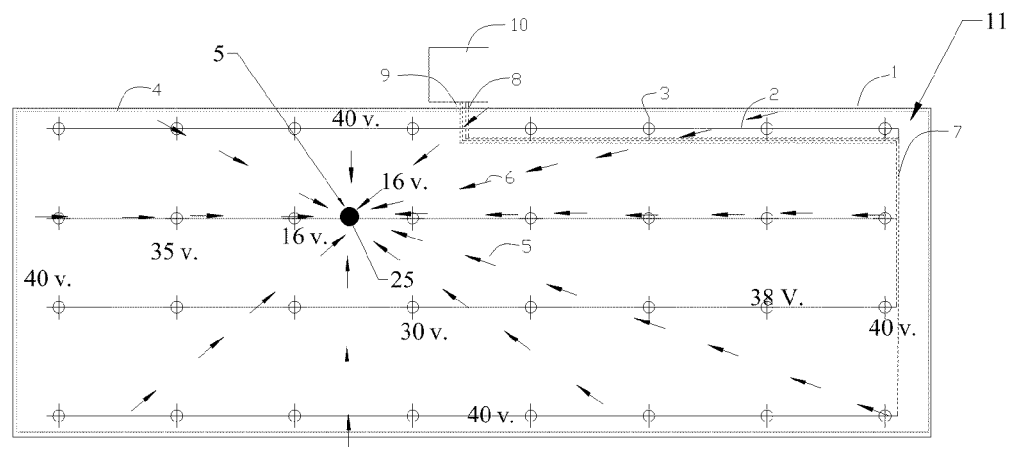
FIG. 8 is a schematic depiction of the system of the present invention with a vector mapping electrical field when the field has access to ground because the system has created an electronic "test leak."

FIG. 8 shows how electronic "test leak" 5 can also generate the same result without an actual leak or breach 12 being present in the roofing or waterproofing membrane 11. The electronic "test leak" 5 is an exposed electrode 25, which lies dormant on the surface of the roofing or waterproofing membrane 11 until activated by computer 10. At that time, an electronic gate is opened allowing electrode 25 to be grounded, and thus imitating a grounded breach or leak, in membrane 11.

Figure 9:
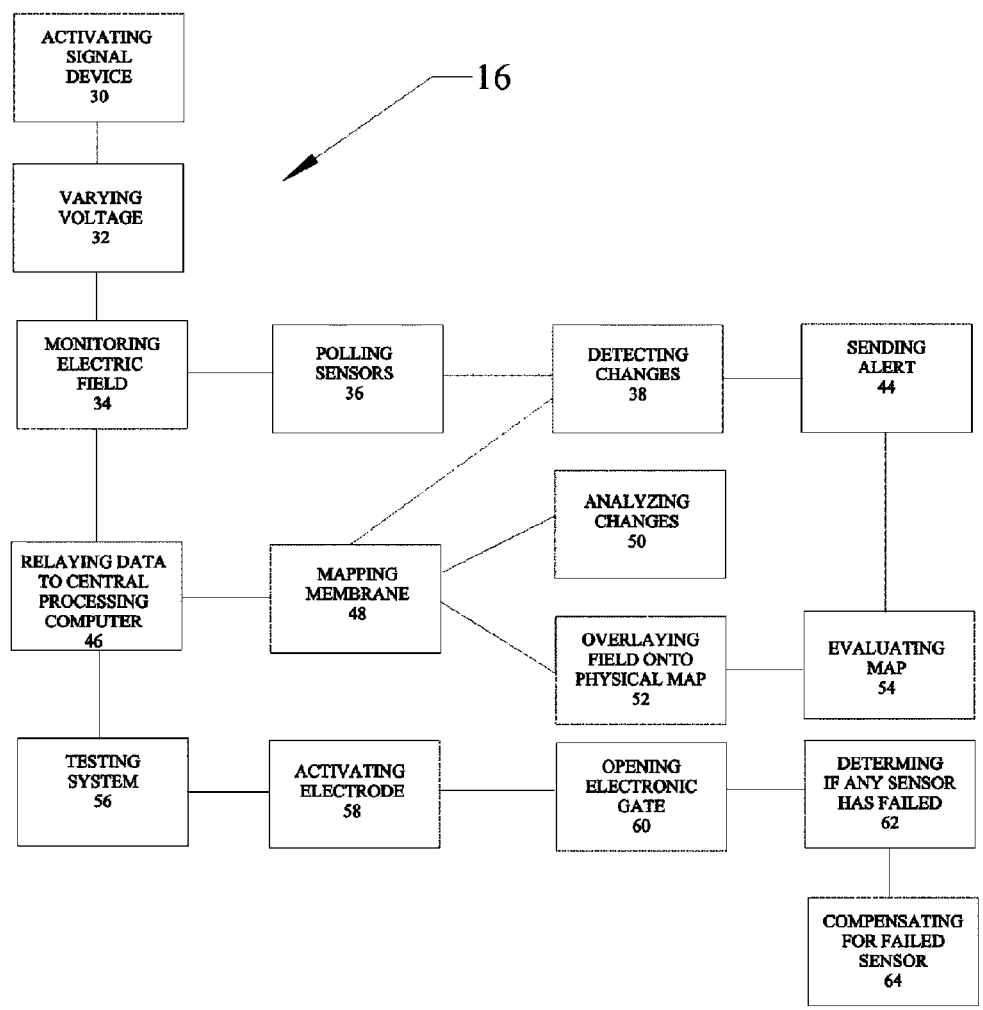
FIG. 9 is a block diagram depicting the functionality of the software product of the present invention.

FIG. 9 is a block diagram describing the functionality of software product 16 of the present invention. A preferred embodiment of software product 16 includes software code for activating the signal device 30, varying the voltage 32, monitoring the electrical field 34, relaying data to central processing computer 46, and testing the system 56.

Executing the software code for activating the signal device 30 may cause signal device 22 to provide a 12-50 volt charge to boundary wire loop 4, creating an electrical field that will indicate leaks or breaches 12 in membrane 11 to be tested. Executing the software code for varying voltage 32 may vary the voltage applied to boundary wire loop 4 to provide maximum definition of leak detection and location.

The software code for monitoring electrical field 34 includes software code for polling sensors 36 and detecting changes 38. Sensors 3 are polled to determine the level of voltage each sensor 3 is measuring. A change in the voltage measured by each sensor 3 may indicate a change in the overall density of the electrical field, which may indicate a leak or breach 12.

In a preferred embodiment, this information is then relayed to central processing computer 18, which is performed by software code for relaying data to central processing computer 46. Central processing computer 18 may then execute software code for mapping membrane 48, evaluating the map 54, and sending an alert 44. The software code for mapping the membrane 48 may also include software code for analyzing changes 50 and overlaying the field onto physical map 52. This analysis and overlay allow for evaluating the map 54 to indicate the location of leak or breach 12. If such a leak or breach 12 is detected and located, software code for sending alert 44 is executed. Sending alert 44 involves letting an appropriate person or entity know of the existence and location of leak or breach 12. This alert may be via any means commonly used in the art, such as by an automated email message, text message, instant message, automated telephone call, or alarm, or through non-automated procedures, such as a person hearing the alarm placing a phone call. In some embodiments, software product 16 does not include software code for relaying data to central processing computer 46 and, instead, includes code itself for mapping membrane 48, analyzing changes 50, overlaying field onto a physical map 52, evaluating the map 54, and sending an alert 44.

Finally, software product 16 comprises software code for testing the system 56. Testing the system 56 involves software code for activating electrode 58, opening electronic gate 60, determining if any sensor has failed 62, and compensating for any failed sensors 64. When executed, the software code for activating the electrode 58 involves activating the exposed electrode 25, which lies dormant somewhere on the surface of membrane 11. When a test is desired, the code for activating electrode 58 and opening electronic gate 60 is executed, allowing electrode 25 to be grounded, thus imitating a grounded breach or leak 12 in membrane 11. This provides a known electronic "test leak" 5. With this known phenomenon, code may be executed for determining if any sensor has failed 62. This allows detection of whether any sensor 3 in the sensor array 24 has failed. If a sensor 3 has failed, compensation may be made for it by executing the code for compensating for failed sensor 64. In this manner, future tests of system 20, either of a staged nature with electrode 25 or as a result of a real leak or breach 12 in membrane 11, may not be compromised by a failed sensor 3, as its failure may be accounted for. Determining if any sensor has failed 62 and compensating for failed sensor 64 need not be executed in conjunction with the execution of activating electrode 58 and opening electronic gate 60, and may be performed by any means commonly used in the art of testing sensors.

Figure 10:
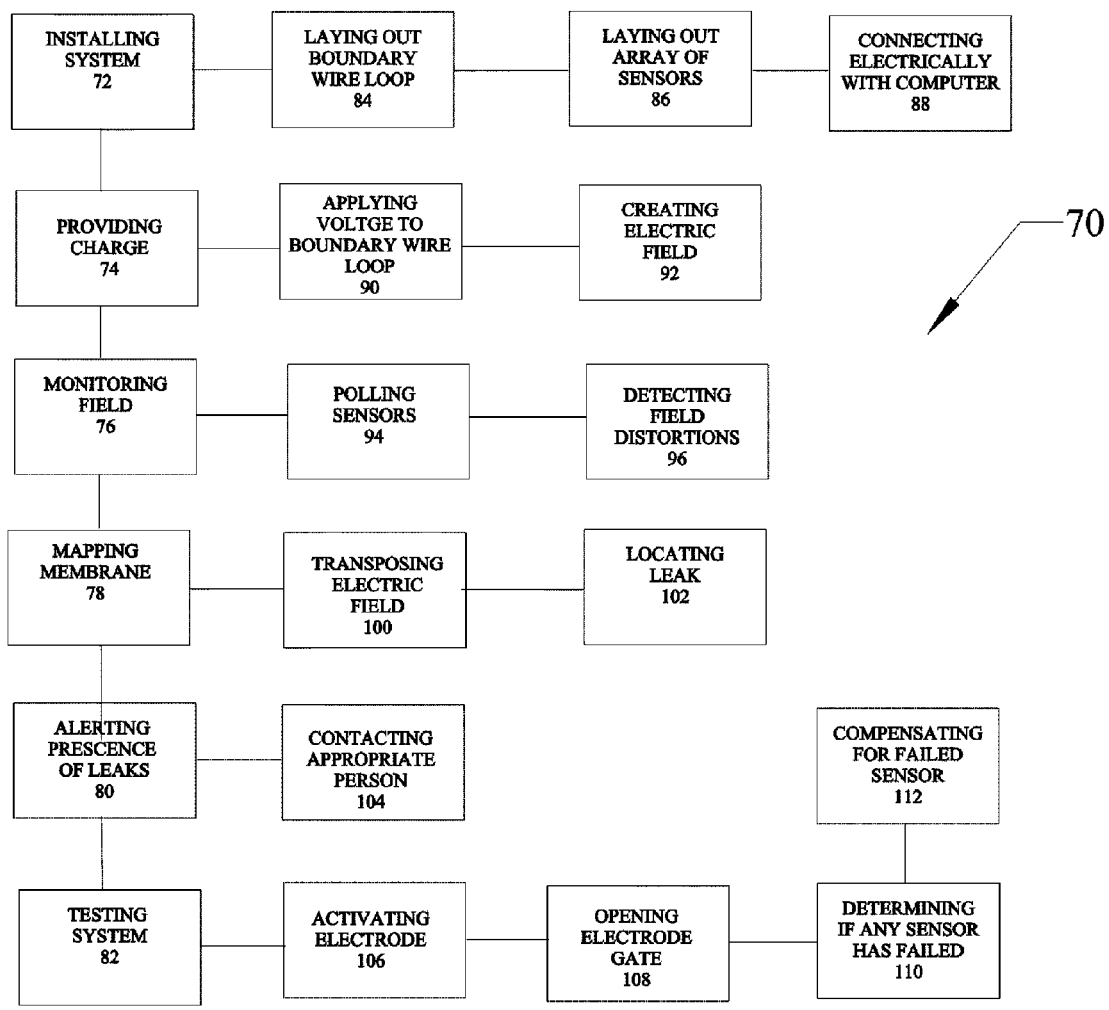
FIG. 10 is a block diagram showing the steps of the method of the present invention.

FIG. 10 is a block diagram showing the steps of method 70 of the present invention. Method 70 of the present invention includes the steps of installing the system 72, providing a charge 74, monitoring the field 76, mapping the membrane 78, and alerting of leaks or breaches 80. In some embodiments, method 70 also comprises the step of testing the system 82.

Installing the System 72

System 20 may be installed with membranes 11 commonly used to waterproof foundations, roof and plaza decks, ponds and reflecting pools, landfills, and environmental lagoons, or anywhere where leakage of water or other contaminants through a protective or contaminant membrane is a concern. This step also includes the steps of laying out the boundary wire loop 84, laying out the array of sensors 86, and connecting electrically with a computer 88. Boundary wire loop 4 may be arranged to be the perimeter of the area of membrane 11 to be tested. Sensor array 24 of sensors 3 may be laid out within this perimeter, on top of membrane 11, such that sensors 3 will be within the electrical field created when boundary wire loop 4 is charged. Sensor array 24 may be in electrical communication with computer 10 such that computer 10 may monitor sensors 3. The electrical communication is preferably through leads 7, 8.

Providing a Charge 74

This step also includes the steps of applying voltage to the boundary wire loop 90 and creating an electrical field 92. Signal device 22 may provide a 12-50 volt charge to boundary wire loop 4, thus creating static electrical tension, otherwise known as an electrical field.

Monitoring the Field 76

This step involves monitoring the state of the electrical field and further comprises the steps of polling each sensor 94 and detecting field distortions 96. Each sensor 3 is polled to determine the level of voltage measured by sensor 3. When the field has no access to ground, i.e. when there is no leak or breach 12, then sensors 3 should indicate relatively constant voltage. If the field becomes distorted from an access to ground, i.e. a leak or breach 12, then the overall density of the field will change, and be indicated by changing voltages at each sensor 3.

Mapping the Membrane 78

This step involves determining the location of leak or breach 12 from the data collected concerning the electrical field. This step also includes the steps of transposing the electrical field 100 and locating the leak or breach 102. A representation of the electrical field may be transposed onto a map of the physical area of membrane 11. The state of the electrical field in relation to the physical locations of membrane 11 may indicate the location of leak or breach 12 on membrane 11.

Alerting of Leaks or Breaches 80

This step occurs if a leak or breach 12 is detected in membrane 11. This step includes the step of contacting an appropriate person if and when leakage occurs and indicating where the leak is located. The notification may be by any means commonly used in the art, such as an email or an alarm.

Testing the System 82

This step involves testing that system 20 is functioning properly. This step may include further steps of activating the electrode 106, opening the electronic gate 108, determining if any sensor has failed 110, and compensating for any failed sensors 112. Activating the electrode 106 involves activating exposed electrode 25, which lies dormant somewhere on the surface of membrane 11. When a test is desired, the steps of activating the electrode 106 and opening the electronic gate 108 occur, allowing electrode 25 to be grounded, thus imitating a grounded breach or leak 12 in membrane 11. This provides a known electronic "test leak" 5. With this known phenomenon, the step of determining if any sensor has failed 110 may occur. This allows detection of whether any sensor 3 in the sensor array 24 has failed. If a sensor 3 has failed, compensation may be made for it by compensating for any failed sensors 112. In this manner, future tests of system 20, either of a staged nature with electrode 25 or as a result of a real leak or breach 12 in membrane 11, may not be compromised by a failed sensor 3, as its failure may be accounted for. The steps of determining if any sensor has failed 110 and compensating for any failed sensors 112 need not be executed in conjunction with activating electrode 106 and opening electronic gate 108, and may be performed by any means commonly used in the art testing sensors.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

What is claimed is:

1. A system for detecting and locating leaks in roofing and waterproofing membranes comprising:
 a detector array comprising a boundary wire loop and a plurality of sensors, wherein said boundary wire loop surrounds an area on top of the membrane to be tested for leaks and wherein said sensors are positioned at predetermined locations within said area to be tested;
 a signal generator in electrical communication with said boundary wire loop, wherein said signal generator applies voltage to said boundary wire loop; and
 a first computer in electrical communication with said boundary wire loop, said sensors, and said signal generator, said first computer comprising a processor, a memory, and a software product for detecting and locating leaks, wherein said software product is stored in said memory and executable by said processor;
 wherein said boundary wire loop creates an electrical field within an area defined by the boundary wire loop, wherein each of said plurality of sensors measures a voltage at a location of each sensor and communicates said voltage to said first computer, and wherein said first software product analyzes differences in voltage between adjacent sensors and any change in voltage in a single sensor from a prior test result stored in memory to detect and determine a location of a leak.

2. The system as claimed in claim 1, wherein said sensors are encased in a flat conductive plastic covered cable forming a chain.

3. The system as claimed in claim 2, wherein a plurality of said chains are arranged in a grid formation within said area to be tested.

4. The system as claimed in claim 1, wherein said sensors are individual wires having open ends for terminations forming a cable such that said open ends, in a string, form a sensor strip.

5. The system as claimed in claim 4, wherein a plurality of said cables are arranged in a grid formation within said area to be tested.

6. The system as claimed in claim 1, wherein said detector array further comprises dedicated leads in electrical communication with said sensors and said first computer such that each of said sensors is in electrical communication with at least one dedicated lead and said at least one dedicated lead is in communication with only one of said sensors.

7. The system as claimed in claim 1, further comprising a central processing computer in electrical communication with said first computer.

8. The system as claimed in claim 7, wherein said electrical communication is via a computer network.

9. The system as claimed in claim 1, further comprising an exposed electrode in electrical communication with said first computer.

10. The system as claimed in claim 1, wherein said signal generator is comprised by said first computer.

11. A software product for detecting and locating leaks in roofing and waterproofing membranes, wherein said software product is stored in computer memory and executable by a computer processor, said software product comprising software code for:
 activating a signal generator wherein the signal generator applies voltage to a boundary wire loop when activated and wherein the voltage application creates an electrical field within an area defined by the boundary wire loop;
 monitoring the electrical field created by said signal generator activation, said monitoring comprising:
 polling sensors for voltage measurements, wherein said sensors are within the area defined by the boundary wire loop; and
 detecting differences in voltage between adjacent sensors and changes in voltage in a single sensor; and
 mapping the membrane, said mapping comprising:
 analyzing data gained from said monitoring of the electrical field; and
 overlaying a depiction of the electrical field onto a schematic of the membrane, wherein the overlaying creates a geographical map of the electrical field;
 evaluating the geographical map such that the geographical location on the membrane of a leak is indicated; and
 sending an alert when said monitoring indicates a leak.

12. The software product as claimed in claim 11, further comprising software code for relaying data to a central processing computer.

13. The software product as claimed in claim 12, wherein said software code for mapping the membrane, evaluating said geographical map, and sending an alert is executed by the central processing computer.

14. The software product as claimed in claim 11, further comprising software code for testing a system, said software code for testing a system comprising software code for activating an exposed electrode.

15. The software product as claimed in claim 14, wherein said software code for testing a system further comprises software code for:
 determining the presence of failed sensors; and
 compensating for said failed sensors.

16. A method for detecting and locating leaks in roofing and waterproofing membranes comprising the steps of:
 installing a leak detection system on top of a membrane, said installing comprising the steps of:
 laying out a boundary wire loop surrounding the area to be tested;
 laying out an array of sensors with the boundary wire loop; and
 connecting the sensors electrically to a computer;
 providing a charge to the leak detection system, said step comprising the step of applying voltage to the boundary wire loop such that an electrical field is created within an area defined by the boundary wire loop;
 monitoring the electrical field, said monitoring comprising the steps of:
 polling each sensor of said array of sensors for voltage measurements; and
 detecting field distortions, said field distortions comprising differences in voltage between adjacent sensors and changes in voltage in a single sensor;
 mapping a membrane, said mapping step comprising the steps of:
 transposing a representation of the electrical field onto a geographical map of the membrane to be tested;
 locating a leak; and
 alerting as to the presence of a leak.

17. The method as claimed in claim 16 further comprising the step of testing the leak detection system, said step of testing said leak detection system comprising the step of activating an exposed electrode.

18. The method as claimed in claim 17, wherein said step of testing the leak detection system further comprises the steps of:
 determining the presence of failed sensors; and
 compensating for any failed sensors.

* * * * *